United States Patent

Matsumoto

(10) Patent No.: US 11,513,843 B2
(45) Date of Patent: Nov. 29, 2022

(54) REMOTE OPERATION SYSTEM, MANAGEMENT CLIENT, AND NON-TRANSITORY COMPUTER-READABLE RECORDING MEDIUM STORING MANAGEMENT CLIENT PROGRAM

(71) Applicant: KYOCERA Document Solutions Inc., Osaka (JP)

(72) Inventor: Atsushi Matsumoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/029,243

(22) Filed: Sep. 23, 2020

(65) Prior Publication Data

US 2021/0096910 A1    Apr. 1, 2021

(30) Foreign Application Priority Data

Sep. 27, 2019   (JP) .............................. JP2019-176651

(51) Int. Cl.
*G06F 9/48*      (2006.01)
*H04L 9/40*      (2022.01)
*H04L 41/0213*   (2022.01)
*H04L 67/01*     (2022.01)

(52) U.S. Cl.
CPC ........ *G06F 9/4881* (2013.01); *H04L 41/0213* (2013.01); *H04L 63/02* (2013.01); *H04L 67/01* (2022.05)

(58) Field of Classification Search
CPC ... G06F 9/4881; H04L 67/42; H04L 41/0213; H04L 41/082; H04L 63/029; H04L 63/02
See application file for complete search history.

(56) References Cited

U.S. PATENT DOCUMENTS

| | | | |
|---|---|---|---|
| 7,561,985 B2* | 7/2009 | Kanai | G06F 11/0709 702/182 |
| 8,379,537 B2* | 2/2013 | Matsuda | H04N 1/00344 370/254 |
| 9,286,246 B2* | 3/2016 | Saito | G06F 11/3055 |
| 9,720,776 B2* | 8/2017 | Takahashi | G06F 11/1438 |
| 10,698,646 B2* | 6/2020 | Nakazawa | G06F 11/3093 |
| 2008/0235776 A1* | 9/2008 | Nakatomi | G06F 21/608 726/7 |
| 2015/0172133 A1* | 6/2015 | Nagashima | H04L 41/50 709/223 |
| 2019/0065706 A1* | 2/2019 | Nishikawa | G06F 3/123 |

FOREIGN PATENT DOCUMENTS

EP    3461063 B1 *  7/2020  ............ H04J 3/0661
JP    2007-026412    2/2007

OTHER PUBLICATIONS

Uses for the Date Calculators, archive.org retrieval of timeanddate.com as it appeared in 2015. pp. 1-5. (Year: 2015).*

* cited by examiner

*Primary Examiner* — John M MacIlwinen
(74) *Attorney, Agent, or Firm* — Lex IP Meister, PLLC

(57) ABSTRACT

A remote operation system includes a management server and a management client that manage an image forming device, wherein the management server manages a task that is an operation for the image forming device by the management client, the task includes a designated start time and date that is a designated time and date to start the task, and the management client regularly acquires the task from the management server and schedules the task in accordance with the designated start time and date included in the task.

8 Claims, 17 Drawing Sheets

24c TASK MANAGEMENT INFORMATION

| TASK ID | TASK TYPE | TASK CONTENT | TASK NAME | DESIGNATED START TIME AND DATE | RETRY SETTING | DEVICE ID | TASK STATUS | TASK CREATOR | ... |
|---|---|---|---|---|---|---|---|---|---|
| 1 | Restart | | Scheduled restart | 2019/09/20 14:30 | 1,10 | PD_KYABC 1230001 | Successful 2019/09/20 14:30:02 | User 1 | ... |
| 2 | Firmware upgrade | | Test upgrade | 2019/09/20 16:00 | 0 | PD_KYABC 1230002 | Waiting | User 2 | ... |
| 3 | Device setting | | Mode change | 2019/09/20 15:30 | 2,5 | PD_KYABC 1230003 | Processing | User 3 | ... |
| . | . | . | . | . | . | . | . | . | . |
| . | . | . | . | . | . | . | . | . | . |
| . | . | . | . | . | . | . | . | . | . |

FIG. 3

24b DEVICE MANAGEMENT INFORMATION

| DEVICE ID | SERIAL NUMBER | ... |
|---|---|---|
| PD_KYABC1230001 | ABC1230001 | ... |
| PD_KYABC1230002 | ABC1230002 | ... |
| PD_KYABC1230003 | ABC1230003 | ... |
| PD_KYABC1230004 | ABC1230004 | ... |
| PD_KYABC1230005 | ABC1230005 | ... |
| ⋮ | ⋮ | ⋮ |

FIG. 4

24c TASK MANAGEMENT INFORMATION

| TASK ID | TASK TYPE | TASK CONTENT | TASK NAME | DESIGNATED START TIME AND DATE | RETRY SETTING | DEVICE ID | TASK STATUS | TASK CREATOR | ... |
|---|---|---|---|---|---|---|---|---|---|
| 1 | Restart | | Scheduled restart | 2019/09/20 14:30 | 1,10 | PD_KYABC 1230001 | Successful 2019/09/20 14:30:02 | User 1 | ... |
| 2 | Firmware upgrade | | Test upgrade | 2019/09/20 16:00 | 0 | PD_KYABC 1230002 | Waiting | User 2 | ... |
| 3 | Device setting | | Mode change | 2019/09/20 15:30 | 2,5 | PD_KYABC 1230003 | Processing | User 3 | ... |
| ... | ... | ... | ... | ... | ... | ... | ... | ... | ... |

FIG. 6

34c TASK STATUS MANAGEMENT INFORMATION

| DEVICE ID | TASK ID | TASK STATUS |
|---|---|---|
| PD_KYABC1230001 | 11 | Waiting |
| PD_KYABC1230002 | 12 | Failed |
| PD_KYABC1230003 | 11 | Processing |
| PD_KYABC1230004 | 11 | Successful |
| PD_KYABC1230005 | 12 | Processing |

TASK INFORMATION

| TASK ID | TASK TYPE | TASK CONTENT | TIME DIFFERENCE | RETRY SETTING | DEVICE ID |
|---------|-----------|--------------|-----------------|---------------|-----------|
|         |           |              |                 |               |           |

FIG. 11

| SCHEDULE TIME AND DATE | TASK ID | TASK TYPE | TASK CONTENT | DESIGNATED START TIME AND DATE | RETRY SETTING | DEVICE ID | ... |
|---|---|---|---|---|---|---|---|
| 2019/09/20 14:30 | 1 | Restart | | 2019/09/20 14:30 | 1,10 | PD_KYABC 1230001 | ... |
| 2019/09/20 15:30 | 3 | Device setting | | 2019/09/20 15:30 | 2,5 | PD_KYABC 1230003 | ... |
| 2019/09/20 16:00 | 2 | Firmware upgrade | | 2019/09/20 16:00 | 0 | PD_KYABC 1230002 | ... |
| ... | ... | ... | ... | ... | ... | ... | ... |

FIG. 17

| Operation type | Task name | Serial number | Status<br>Timestamp | Created by |
|---|---|---|---|---|
| Restart | Scheduled restart | ABC1230001 | Successful<br>End time: 2019/05/16 14:50:02 | User 1 |
| Firmware upgrade | Test upgrade | ABC1230001 | Successful<br>End time: 2019/05/16 14:52:03 | User 3 |
| Firmware upgrade | Test upgrade2 | ABC1230004 | Waiting | User 2 |
| Device settings | Mode change | ABC1230002 | Successful<br>End time: 2019/05/15 21:48:18 | User 1 |
| Restart | Network restart | ABC1230001 | Processing | User 3 |
| Firmware upgrade | Upgrade testings | ABC1230003 | Failed<br>End time: 2019/05/15 11:20:47 | User 3 |

FIG. 18

| Operation type | Task name | Serial number | Status<br>Timestamp | Created by |
|---|---|---|---|---|
| Restart | Scheduled restart | ABC1230001 | Successful<br>End time: 2019/05/16 14:52:52 | User 1 |
| Firmware upgrade | Test upgrade | 2 devices ^ | Processing | User 2 |
| | | ABC1230004 | Processing | |
| | | ABC1230005 | Successful<br>End time: 2019/05/15 21:48:16 | |
| Restart | Network restart | ABC1230001 | Processing | User 3 |
| Firmware upgrade | Upgrade testings | ABC1230003 | Failed<br>End time: 2019/05/15 11:20:47 | User 3 |

REMOTE OPERATION SYSTEM, MANAGEMENT CLIENT, AND NON-TRANSITORY COMPUTER-READABLE RECORDING MEDIUM STORING MANAGEMENT CLIENT PROGRAM

INCORPORATION BY REFERENCE

This application is based upon, and claims the benefit of priority from, corresponding Japanese Patent Application No. 2019-176651 filed in the Japan Patent Office on Sep. 27, 2019, the entire contents of which are incorporated herein by reference.

BACKGROUND

Field of the Invention

The present disclosure relates to a remote operation system that remotely operates an electronic device, a management client, and a non-transitory computer-readable recording medium storing a management client program.

Description of Related Art

There is a conventionally known remote operation system including a remote maintenance center that manages a maintenance target device and a maintenance mediation device. The remote maintenance center manages the maintenance operation instruction information for instructing a maintenance operation on the maintenance target device by the maintenance mediation device. The maintenance mediation device regularly acquires the maintenance operation instruction information from the remote maintenance center and executes the maintenance operation indicated by the maintenance operation instruction information. However, in the conventional remote operation system, there is a problem in that the maintenance operation may be executed by the maintenance mediation device at a less appropriate timing.

SUMMARY

A remote operation system according to the present disclosure includes a management server and a management client that manage an electronic device, wherein the management server manages a task that is an operation on the electronic device by the management client, the task includes a designated start time and date that is a time and date designated to start the task, and the management client regularly acquires the task from the management server and schedules the task in accordance with the designated start time and date included in the task.

In the remote operation system according to the present disclosure, when a current time and date is after a time and date scheduled for the task and when there is a different task being executed or waiting to be executed for the electronic device, the management client may wait for the scheduled task to be executed.

In the remote operation system according to the present disclosure, the management server may store task management information to manage the task, the task management information may include a task status that is a status of the task, the management client may instruct the management server to update the task status when the task status is changed, and the management server may update the task status in the task management information as instructed by the management client.

In the remote operation system according to the present disclosure, when the management client has not given an instruction to update the task status even when a specific period of time has elapsed since the designated start time and date, the management server may set the task status in the task management information to a failure status of execution of the task.

In the remote operation system according to the present disclosure, the management client may regularly instruct the management server to update the task status of the task while the task is executed, and the management server may set the task status in the task management information to a failure status of execution of the task when a specific period of time has elapsed since previously instructed by the management client to update the task status while the task status in the task management information is a status of the task being executed.

In the remote operation system according to the present disclosure, the management client may give, for each of the electronic devices, an instruction to update the task status of the task having the electronic devices as an execution target, and the task management information may include the task status for each combination of the task and the electronic device.

A management client according to the present disclosure is a management client that manages an electronic device, wherein, from a management server that manages a task that is an operation on the electronic device by the management client, the management client regularly acquires the task, the task includes a designated start time and date that is a time and date designated to start the task, and the management client schedules the task in accordance with the designated start time and date included in the task.

A non-transitory computer-readable recording medium according to the present disclosure stores a management client program, the management client program is a management client program that causes a computer to function as a management client that manages an electronic device, from a management server that manages a task that is an operation on the electronic device by the management client, the management client regularly acquires the task, the task includes a designated start time and date that is a time and date designated to start the task, and the management client schedules the task in accordance with the designated start time and date included in the task.

BRIEF DESCRIPTION OF THE DRAWINGS

FIG. 3 is a diagram illustrating an example of device management information illustrated in FIG. 2;

FIG. 4 is a diagram illustrating an example of task management information illustrated in FIG. 2;

FIG. 6 is a diagram illustrating an example of task status management information illustrated in FIG. 5;

FIG. 11 is a diagram illustrating an example of tasks registered in a scheduler of the management client illustrated in FIG. 5;

FIG. 17 is an example of a screen displayed on a display unit illustrated in FIG. 2 and displaying multiple tasks, each of which has one image forming device as the execution target; and FIG. 18 is an example of the screen displayed on the display unit illustrated in FIG. 2 and displaying multiple tasks including a task having multiple image forming devices as the execution target.

DETAILED DESCRIPTION

An embodiment of the present disclosure is described below by using the drawings.

First, a configuration of a system according to an embodiment of the present disclosure is described.

Figure 1:
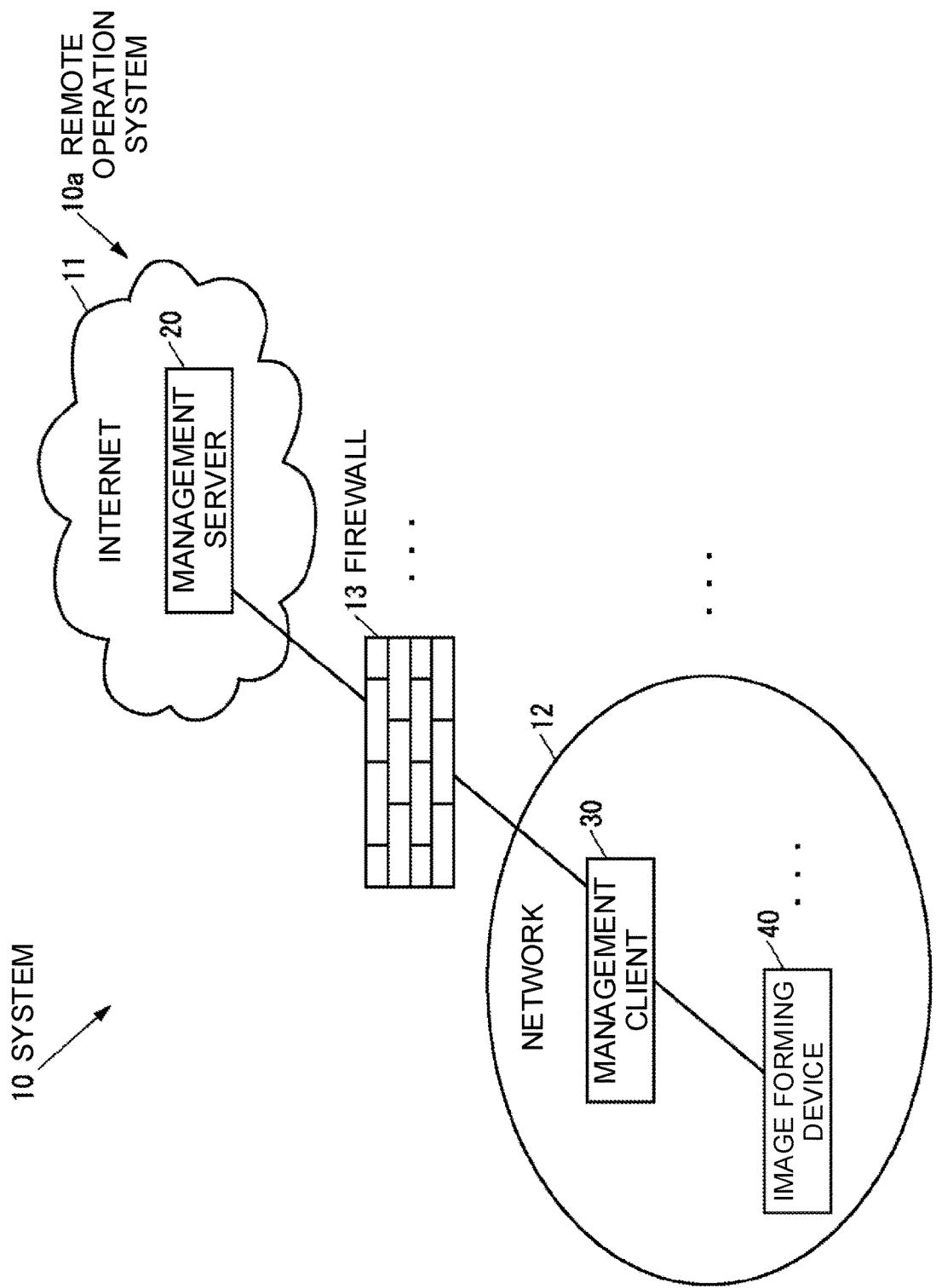
FIG. 1 is a block diagram of a system according to an embodiment of the present disclosure.

FIG. 1 is a block diagram of a system 10 according to the present embodiment.

As illustrated in FIG. 1, the system 10 includes a management server 20 that manages an image forming device such as a multifunction peripheral (MFP) or a dedicated printer machine. The management server 20 is provided in an internet 11. The management server 20 may be configured by using one computer or a plurality of computers. The management server 20 is used by an operator (hereinafter referred to as "administrator") that manages the image forming device.

The system 10 includes a management client 30 that manages the image forming device provided in a network 12 of a client of the administrator. The management client 30 is provided in the network 12 of the client of the administrator. The network 12 is, for example, a local area network (LAN). The management client 30 serves as a mediation device that couples the management server 20 provided outside the network 12 and the image forming device provided in the network 12. The management client 30 is configured by using a computer such as a personal computer (PC). The management server 20 and the management client 30 constitute a remote operation system 10a that remotely operates the image forming device provided in the network 12.

The system 10 includes an image forming device 40 that is provided in the network 12 and serves as an electronic device used by the client. The system 10 may include at least one image forming device in the network 12 in addition to the image forming device 40.

The system 10 includes a firewall 13 that restricts or prohibits accesses from the internet 11 side to the network 12 side.

The communication between the management server 20 and the management client 30 is executed by, for example, the Hypertext Transfer Protocol (HTTP). The communication between the management client 30 and the image forming device provided in the network 12 is executed by, for example, HTTP and the Simple Object Access Protocol (SOAP) or the Simple Network Management Protocol (SNMP).

In addition to the combination of the network 12 and the firewall 13, the system 10 may include at least one combination of a network and a firewall having the same configuration as that of the combination of the network 12 and the firewall 13.

Figure 2:
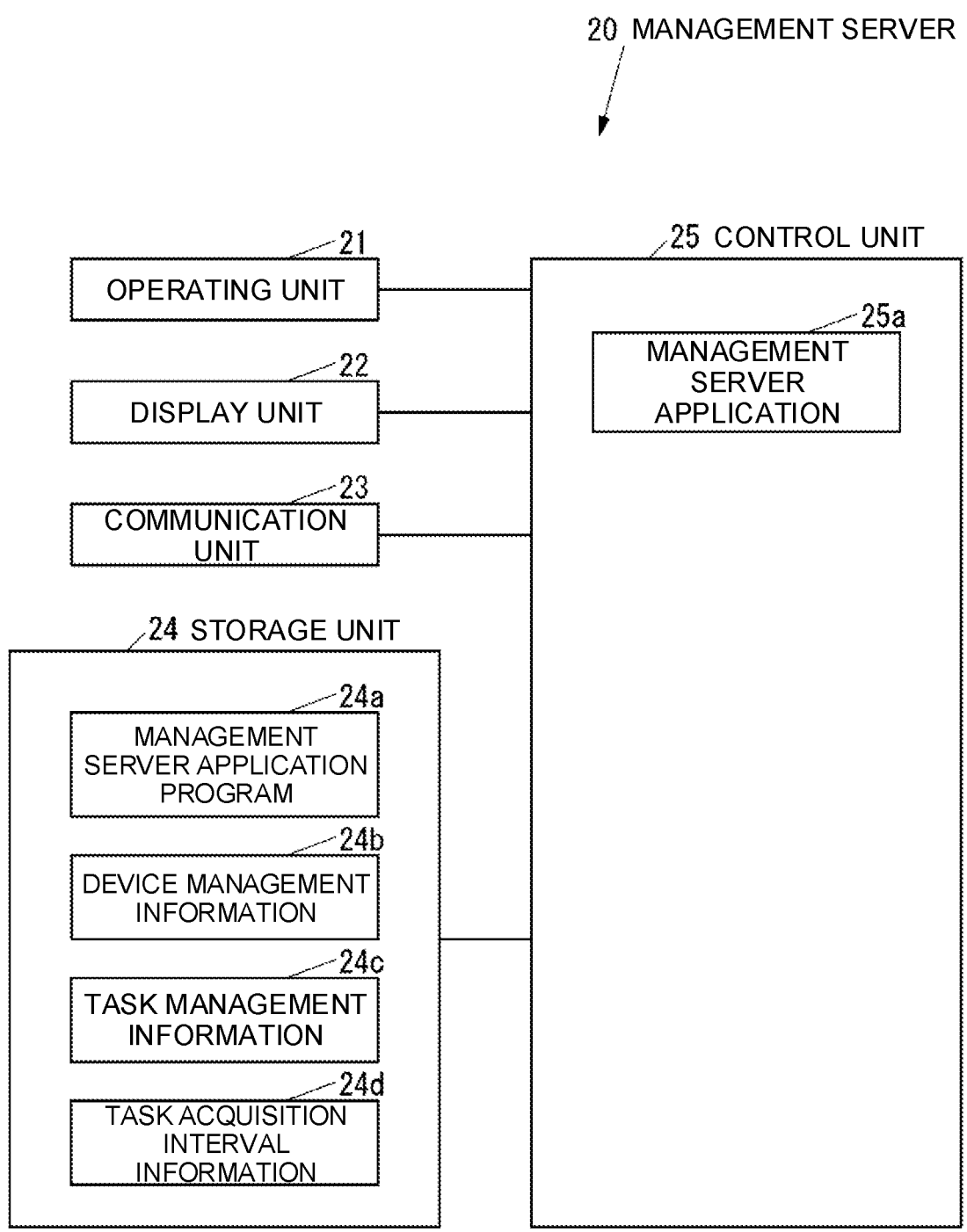
FIG. 2 is a block diagram of a management server illustrated in FIG. 1 when the management server is configured by using one computer.

FIG. 2 is a block diagram of the management server 20 when the management server 20 is configured by using one computer.

As illustrated in FIG. 2, the management server 20 includes: an operating unit 21 that is an operating device, such as a keyboard or a mouse, to which various operations are input; a display unit 22 that is a display device, such as a liquid crystal display (LCD), which displays various types of information; a communication unit 23 that is a communication device that communicates with an external device via a network, such as a LAN or the Internet, or directly with a wire or wirelessly without any network; a storage unit 24 that is a non-volatile storage device, such as a semiconductor memory or a hard disk drive (HDD), which stores various types of information; and a control unit 25 that controls the overall management server 20.

The storage unit 24 may store a management server application program 24a to manage the image forming device. For example, the management server application program 24a may be installed in the management server 20 at the manufacturing stage of the management server 20, may be additionally installed in the management server 20 from an external storage medium such as a compact disk (CD), a digital versatile disk (DVD), or a universal serial bus (USB) memory, or may be additionally installed in the management server 20 from a network.

The storage unit 24 stores device management information 24b to manage the image forming device that is the target to be managed by the management server 20.

FIG. 3 is a diagram illustrating an example of the device management information 24b.

As illustrated in FIG. 3, for each image forming device, the device management information 24b includes, for example, a device ID that is the identification information of the image forming device and a serial number of the image forming device. The device ID is the information for uniquely identifying the image forming device.

As illustrated in FIG. 2, the storage unit 24 stores task management information 24c for managing a task that is a maintenance operation performed by the management client on the image forming device.

FIG. 4 is a diagram illustrating an example of the task management information 24c.

As illustrated in FIG. 4, for each task, the task management information 24c includes, for example, the task ID that is the identification information on a task, the type of task (hereinafter referred to as "task type"), the specific content of a task (hereinafter referred to as "task content"), the task name indicating the name of a task, the designated start time and date that is the designated time and date when a task is started, the retry setting indicating the details of the settings for task re-execution, the device ID of the image forming device for which a task is to be executed, the status of a task (hereinafter referred to as "task status"), and the identification information on the creator of a task (hereinafter referred to as "task creator"). The specific values of the task content are omitted from the illustration of FIG. 4.

The task ID is the information automatically generated by the management server 20 to uniquely identify a task.

Examples of the task type include the restart of the image forming device, the update to the firmware of the image forming device, and the setting of a value to the setting item of the image forming device. In the illustration of FIG. 4, the restart of the image forming device, the update to the firmware of the image forming device, and the setting of a value for the setting item of the image forming device are "Restart", "Firmware upgrade", and "Device setting", respectively.

The retry setting includes the retry count indicating the upper limit of the count of task re-executions and the retry interval indicating the interval between task re-executions. In FIG. 4, "1, 10" indicates the retry count of one time and the retry interval of 10 minutes, respectively, and "2, 5" indicates that the retry count of twice and the retry interval of 5 minutes, respectively. In FIG. 4, "0" indicates no task re-execution.

Examples of the task status include "Waiting" indicating the status of waiting for the execution of a task, "Processing" indicating the status of executing a task, "Successful" indicating the successful status of the execution of a task, "Failed" indicating the failure status of the execution of a task, and "Canceled" indicating the canceled status of a task in the management server 20. "Successful" and "Failed" additionally include the time and date when the respective statuses are obtained.

The task with a blank space in the task status in the task management information 24c is a task that has not been executed yet by the management client 30. That is, the task with a blank space in the task status in the task management information 24c is a task that is scheduled to be executed by the management client 30. Hereinafter, the task with a blank space in the task status in the task management information 24c is referred to as a scheduled task.

As illustrated in FIG. 2, the storage unit 24 may store the regular task acquisition timing by the management client 30, that is, task acquisition interval information 24d indicating a task acquisition interval. Any period of time, such as three hours, may be designated as the task acquisition interval.

The control unit 25 includes, for example, a central processing unit (CPU), a ROM read-only memory (ROM) that stores a program and various types of data, and a random access memory (RAM) serving as a memory used as a work area for the CPU of the control unit 25. The CPU of the control unit 25 executes a program stored in the storage unit 24 or the ROM of the control unit 25.

The control unit 25 executes the management server application program 24a to implement a management server application 25a that manages the image forming device.

The management server application 25a may set the task acquisition interval information 24d in response to an instruction via the operating unit 21 or the communication unit 23.

Figure 5:
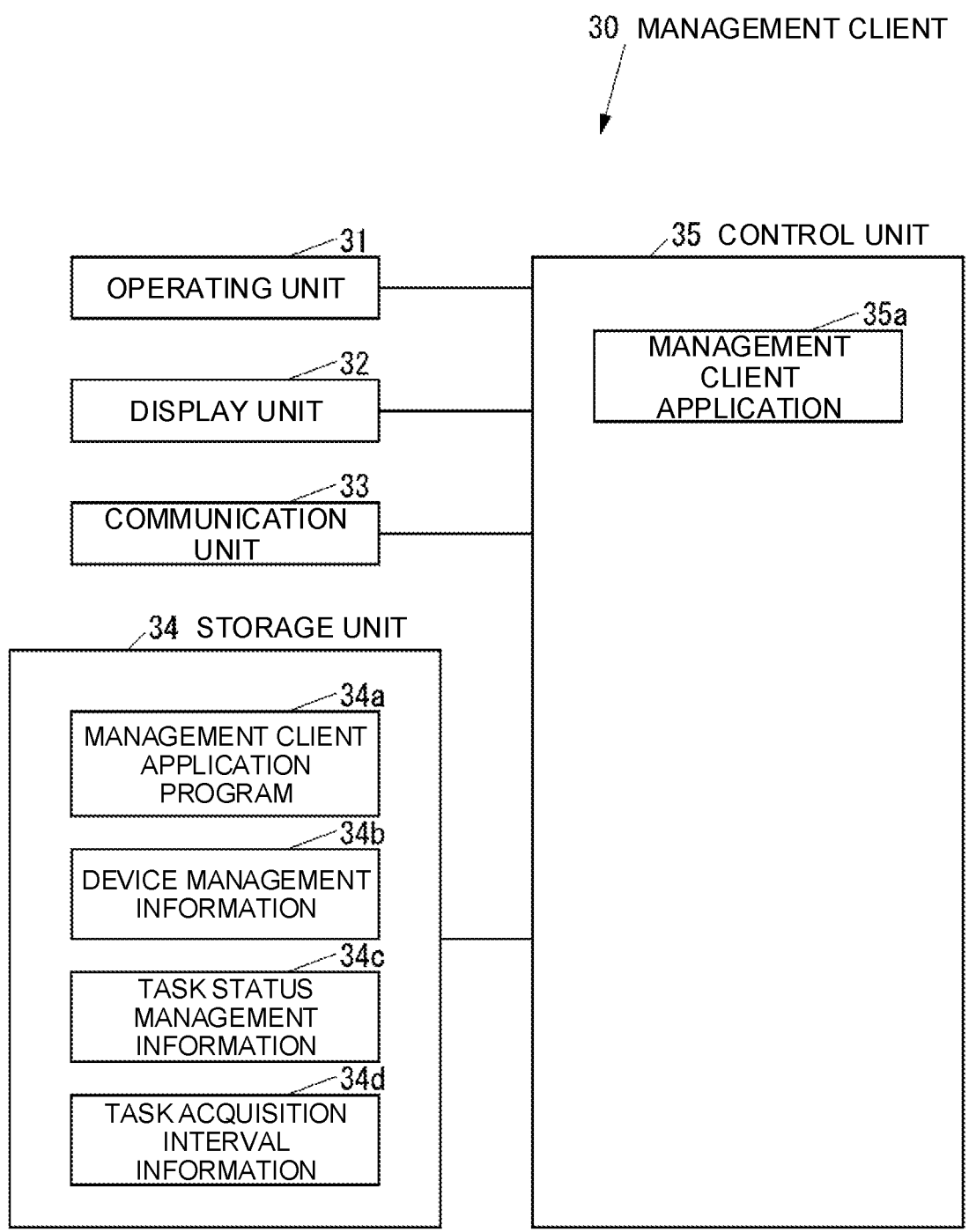
FIG. 5 is a block diagram of a management client illustrated in FIG. 1 when the management client is configured by using one computer.

FIG. 5 is a block diagram of the management client 30 when the management client 30 is configured by using one computer.

As illustrated in FIG. 5, the management client 30 includes: an operating unit 31 that is an operating device, such as a keyboard or a mouse, to which various operations are input; a display unit 32 that is a display device, such as an LCD, which displays various types of information; a communication unit 33 that is a communication device that communicates with an external device via a network, such as a LAN or the Internet, or directly with a wire or wirelessly without any network; a storage unit 34 that is a non-volatile storage device, such as a semiconductor memory or an HDD, which stores various types of information; and a control unit 35 that controls the overall management client 30.

The storage unit 34 may store a management client application program 34a that is a management client program for managing the image forming device. For example, the management client application program 34a may be installed in the management client 30 at the manufacturing stage of the management client 30, may be additionally installed in the management client 30 from an external storage medium such as a CD, a DVD, or a USB memory, or may be additionally installed in the management client 30 from a network.

The storage unit 34 stores device management information 34b for managing the image forming device that is the target to be managed by the management client 30. The device management information 34b is information similar to the device management information 24b (see FIG. 3).

The storage unit 34 stores task status management information 34c for managing the task status.

FIG. 6 is a diagram illustrating an example of the task status management information 34c.

As illustrated in FIG. 6, for each task, the task status management information 34c includes, for example, the device ID of the image forming device for which a task is executed, the task ID, and the task status.

As illustrated in FIG. 5, the storage unit 34 stores task acquisition interval information 34d indicating a task acquisition interval.

The control unit 35 includes, for example, a CPU, a ROM that stores a program and various types of data, and a RAM serving as a memory used as a work area for the CPU of the control unit 35. The CPU of the control unit 35 executes a program stored in the storage unit 34 or the ROM of the control unit 35.

The control unit 35 executes the management client application program 34a to implement a management client application 35a that manages the image forming device.

The management client application 35a may set the task acquisition interval information 34d in response to an instruction via the operating unit 31 or the communication unit 33. The management client application 35a may access the management server 20 at regular intervals, acquire the task acquisition interval indicated by the task acquisition interval information 24d from the management server 20 when the task acquisition interval information 24d is set in the management server 20, and set the acquired task acquisition interval in the task acquisition interval information 34d.

Next, an operation of the system 10 is described.

First, an operation of the management server 20 when a task is generated is described.

Figure 7:
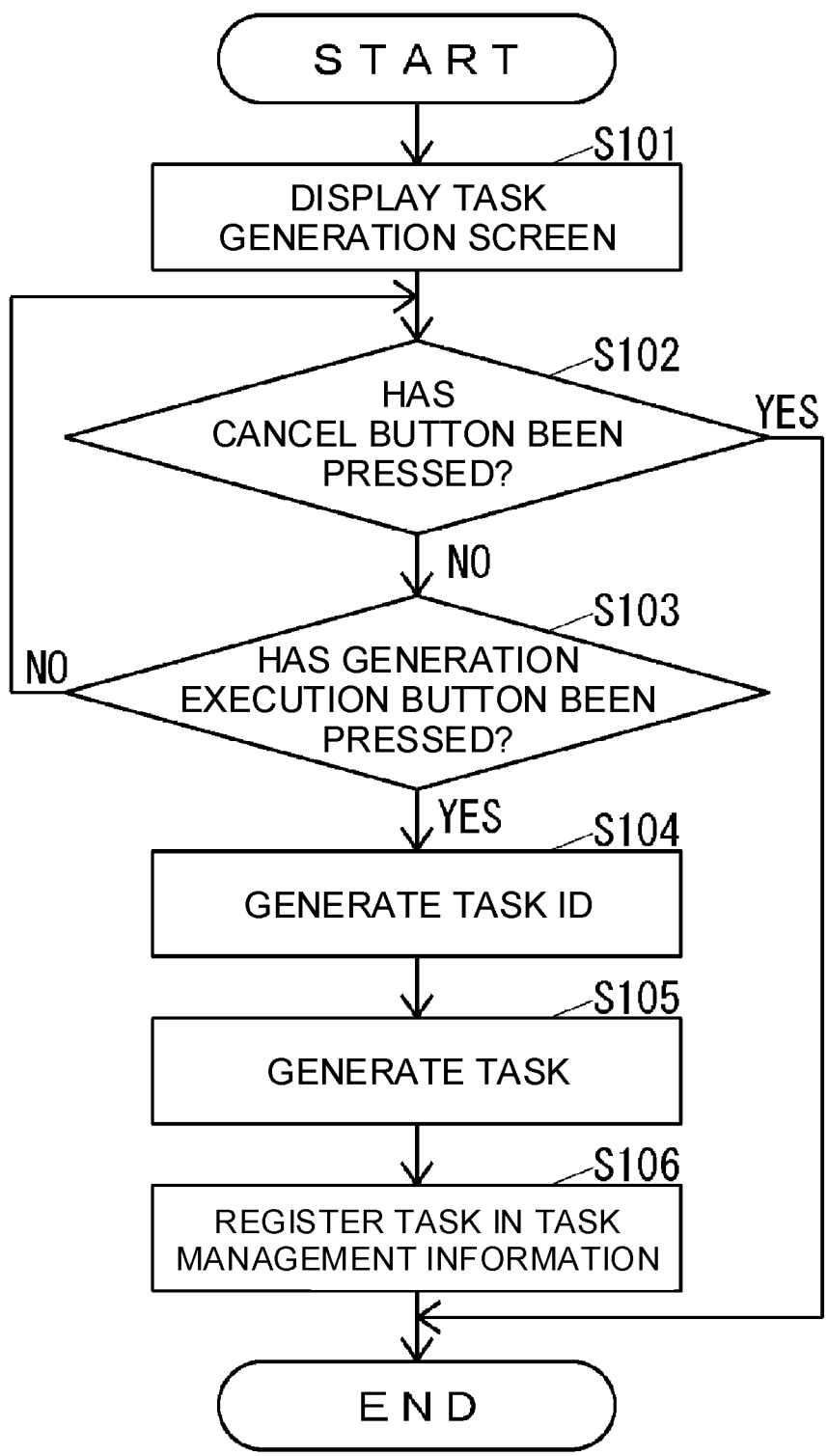
FIG. 7 is a flowchart of the operation of the management server illustrated in FIG. 2 when a task is generated.

FIG. 7 is a flowchart of the operation of the management server 20 when a task is generated.

The user of the management server 20 may give an instruction so as to start the process of generating a task via the operating unit 21 or the communication unit 23 of the management server 20. The control unit 25 of the management server 20 performs the operation illustrated in FIG. 7 when the instruction is given to start the process of generating a task.

As illustrated in FIG. 7, the management server application 25a displays a task generation screen for generating the task (S101). Here, when the instruction has been given to start the task generation process via the operating unit 21, the management server application 25a displays the task generation screen on the display unit 22. On the other hand, when the instruction has been given to start the task generation process via the communication unit 23, the management server application 25a transmits the data on the task generation screen via the communication unit 23. Accordingly, a computer (not illustrated) may display the task generation screen based on the data received from the management server 20.

Figure 8:
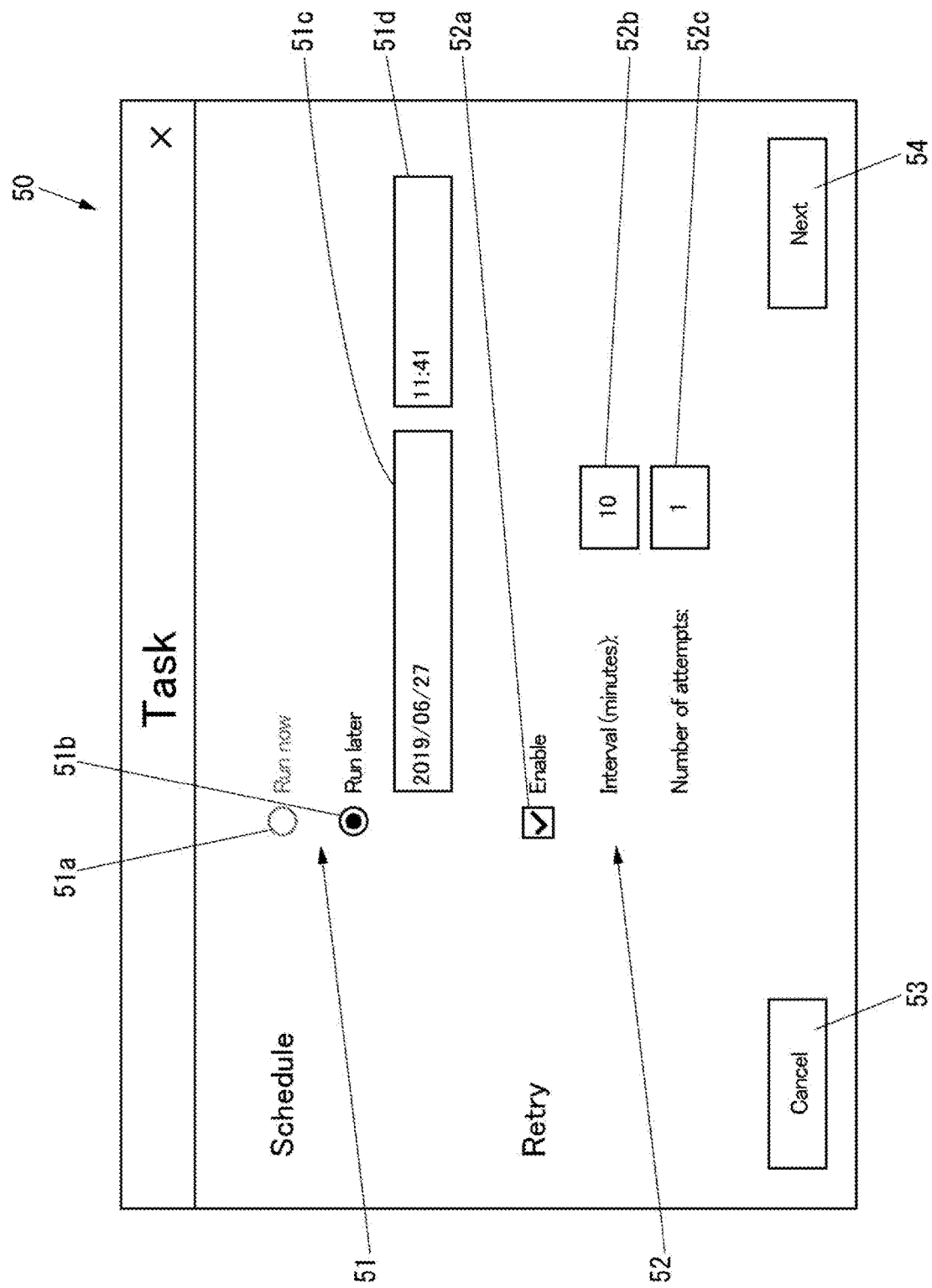
FIG. 8 is a diagram illustrating an example of a first page of a task generation screen displayed in the operation illustrated in FIG. 7.

FIG. 8 is a diagram illustrating an example of a first page of a task generation screen 50 displayed in the operation illustrated in FIG. 7.

The task generation screen 50 illustrated in FIG. 8 includes: an area 51 for specifying the designated start time and date of the task; an area 52 for specifying the retry setting of the task; a Cancel button 53 for canceling the generation of the task; and a Next button 54 for proceeding to the next page.

The area 51 includes: a radio button 51a for specifying the setting of the task generation time and date as a designated start time and date; a radio button 51b for specifying the setting of the time and date designated by the user as a designated start time and date; a text box 51c for specifying the date of the designated start time and date; and a text box 51d for specifying the time of the designated start time and date. When one of the radio button 51a and the radio button 51b is selected, the other one is unselectable. When the radio button 51b is selected, the management server application 25a sets the time and date designated in the text box 51c and the text box 51d as a designated start time and date.

The area 52 includes a check box 52a for specifying whether the task is to be re-executed; a text box 52b for specifying the retry interval by minutes; and a text box 52c for specifying the retry count.

As illustrated in FIG. 7, the management server application 25a determines whether the Cancel button 53 has been pressed after the process at S101 (S102).

When it is determined that the Cancel button 53 has been pressed at S102, the management server application 25a terminates the operation illustrated in FIG. 7.

When it is determined at S102 that the Cancel button 53 has not been pressed, the management server application 25a determines whether a generation execution button (not illustrated) for giving an instruction for the task generation has been pressed on the task generation screen 50 (S103).

When it is determined at S103 that the generation execution button has not been pressed, the management server application 25a executes the process at S102.

When it is determined at S103 that the generation execution button has been pressed, the management server application 25a automatically generates a task ID (S104).

Subsequently, the management server application 25a generates the task including the task ID generated at S104, the task type specified on the task generation screen, the task content, the task name, the designated start time and date, the retry setting, the device ID, and the task creator (S105).

Then, the management server application 25a registers the task generated at S105 in the task management information 24c (S106) and terminates the operation illustrated in FIG. 7.

Subsequently, the operation of the system 10 when the management client 30 acquires a scheduled task from the management server 20 is described.

Figures 9, 10:
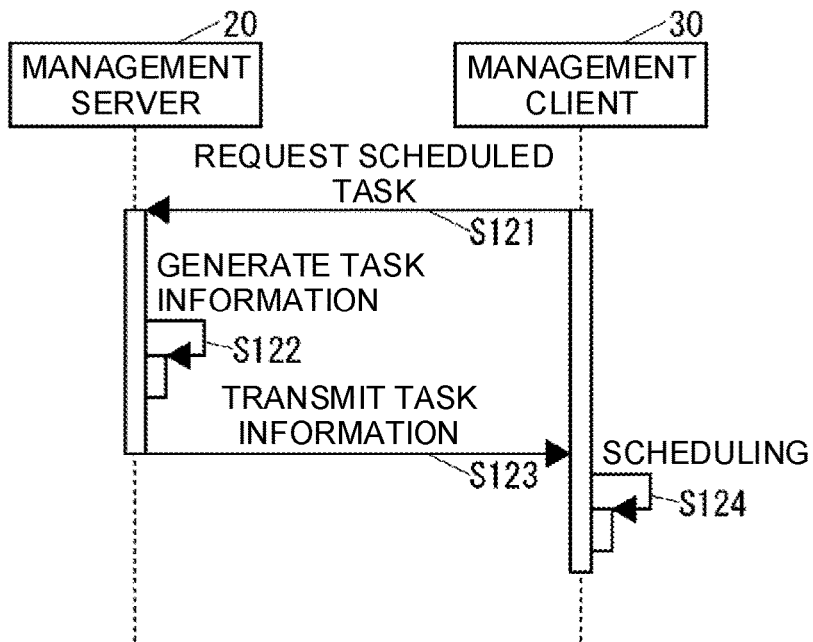
FIG. 9 is a sequence diagram of the operation of the system illustrated in FIG. 1 when the management client acquires a scheduled task from the management server.
FIG. 10 is a diagram illustrating item names of task information generated in the operation illustrated in FIG. 9.

FIG. 9 is a sequence diagram of the operation of the system 10 when the management client 30 acquires a scheduled task from the management server 20.

The management client application 35a of the management client 30 regularly requests a scheduled task stored in the management server 20 from the management server 20 at the task acquisition interval indicated by the task acquisition interval information 34d, as illustrated in FIG. 9 (S121).

In response to the received request at S121, the management server application 25a of the management server 20 generates task information, which is the information for passing the task to the management client 30, for each scheduled task indicated by the task management information 24c (S122).

FIG. 10 is a diagram illustrating item names of the task information generated in the operation illustrated in FIG. 9.

As illustrated in FIG. 10, the task information includes the task ID, the task type, the task content, the time difference between the designated start time and date and the current time and date in the management server 20, the retry setting, and the device ID of the image forming device for which the task is to be executed.

As illustrated in FIG. 9, after the process at S122, the management server application 25a of the management server 20 transmits the task information on all the scheduled tasks generated at S122 to the management client 30 (S123).

In response to the received task information transmitted at S123, the management client application 35a of the management client 30 schedules the scheduled task in accordance with the designated start time and date based on the received task information (S124). Specifically, the management client application 35a registers the scheduled task in a scheduler so that the scheduled task is executed at the designated start time and date.

FIG. 11 is a diagram illustrating an example of tasks registered in the scheduler of the management client 30.

As illustrated in FIG. 11, the task registered in the scheduler of the management client 30 includes the schedule time and date that is the scheduled time and date, the task ID, the task type, the task content, the designated start time and date, the retry setting, and the device ID of the image forming device for which the task is to be executed. Specific values of the task content are omitted from FIG. 11.

When the scheduled task is registered in the scheduler, the management client application 35a of the management client 30 applies the time difference included in the task information to the current time and date in the management client 30 to generate the designated start time and date of the scheduled task. Thus, the management client application 35a may execute the scheduled task in the timing intended by the task creator of the scheduled task in a case where the time zone where the management server 20 is provided is different from the time zone where the management client 30 is provided and also in a case where the current time and date set in the management server 20 is different from the current time and date set in the management client 30 although the time zone where the management server 20 is provided is identical to the time zone where the management client 30 is provided.

When the task (hereinafter referred to as "old task") with the task ID that is identical to the task ID of the scheduled task (hereinafter referred to as "new task"), which is to be newly registered in the scheduler, is already registered in the scheduler at S124, the management client application 35a deletes the old task from the scheduler and registers the new task in the scheduler. That is, the management client application 35a reschedules the scheduled task. With this configuration, the management client application 35a may operate properly even when the designated start time and date of the scheduled task is changed in the management server 20.

Next, an operation of the system 10 when the current time and date is after the schedule time and date of the task registered in the scheduler of the management client 30 is described.

Figure 12:
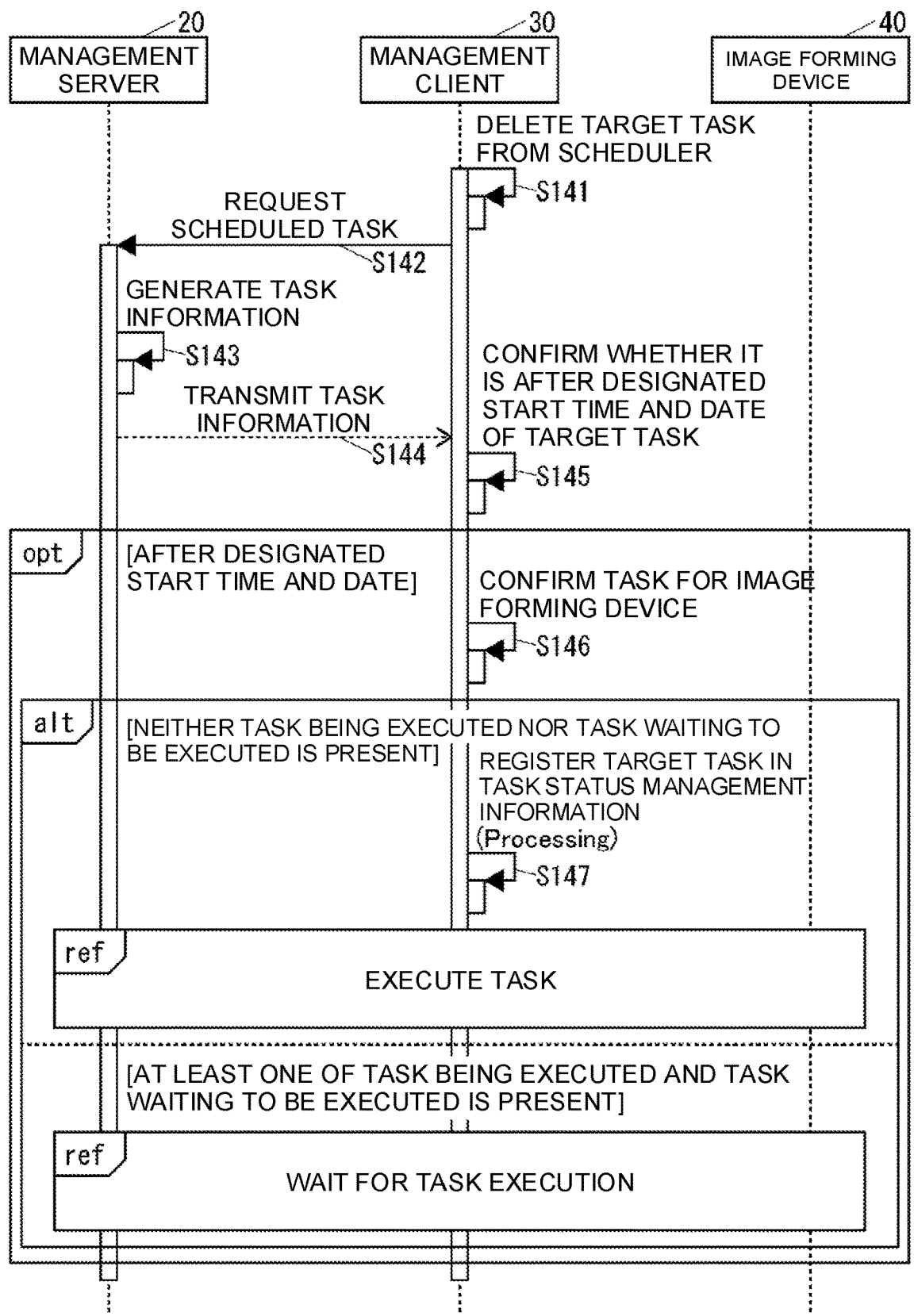
FIG. 12 is a sequence diagram of an operation of the system illustrated in FIG. 1 when the current time and date is after the schedule time and date of the task registered in the scheduler of the management client.
Figure 13:
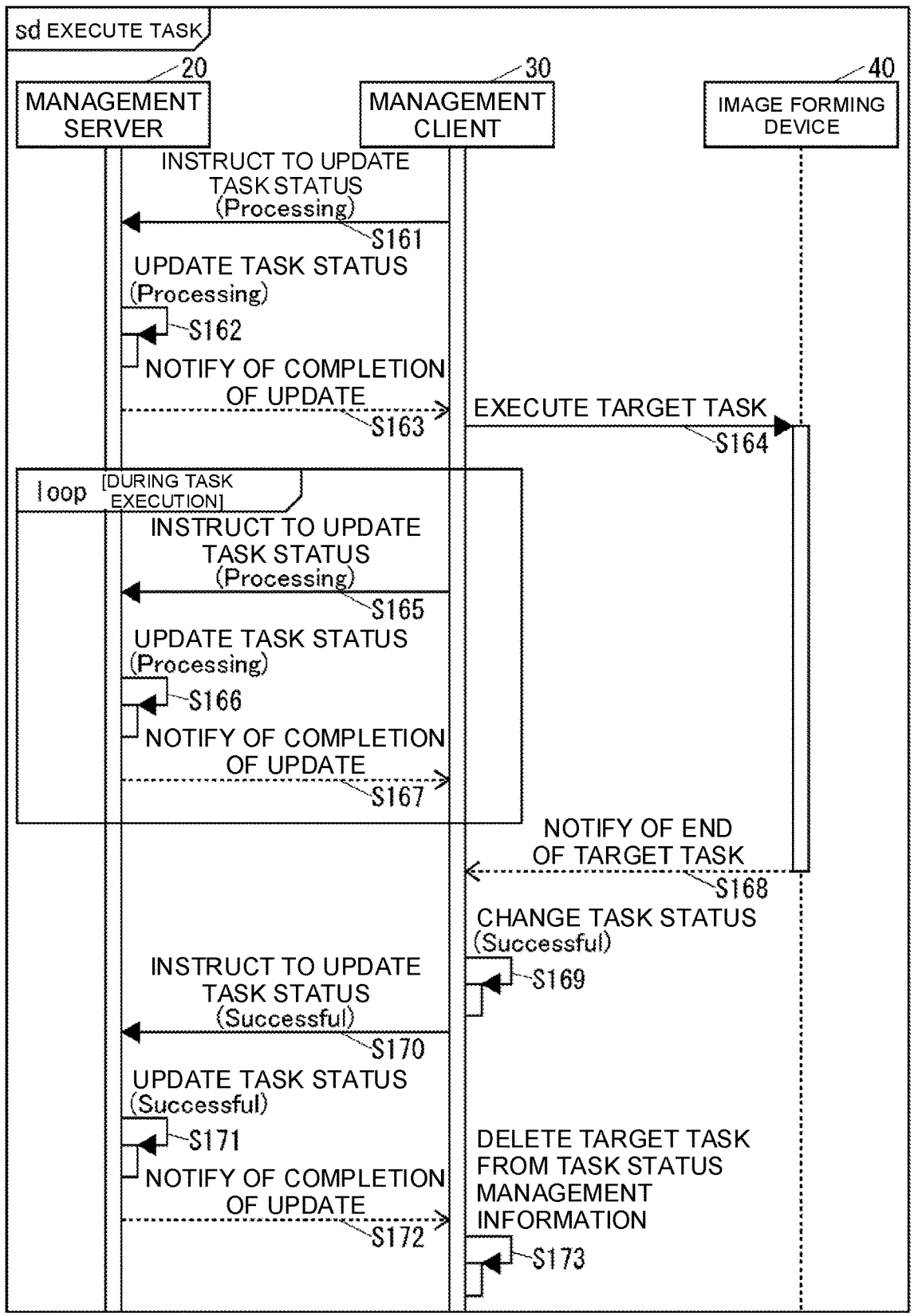
FIG. 13 is a sequence diagram of part of the sequence diagram illustrated in FIG. 12.
Figure 14:
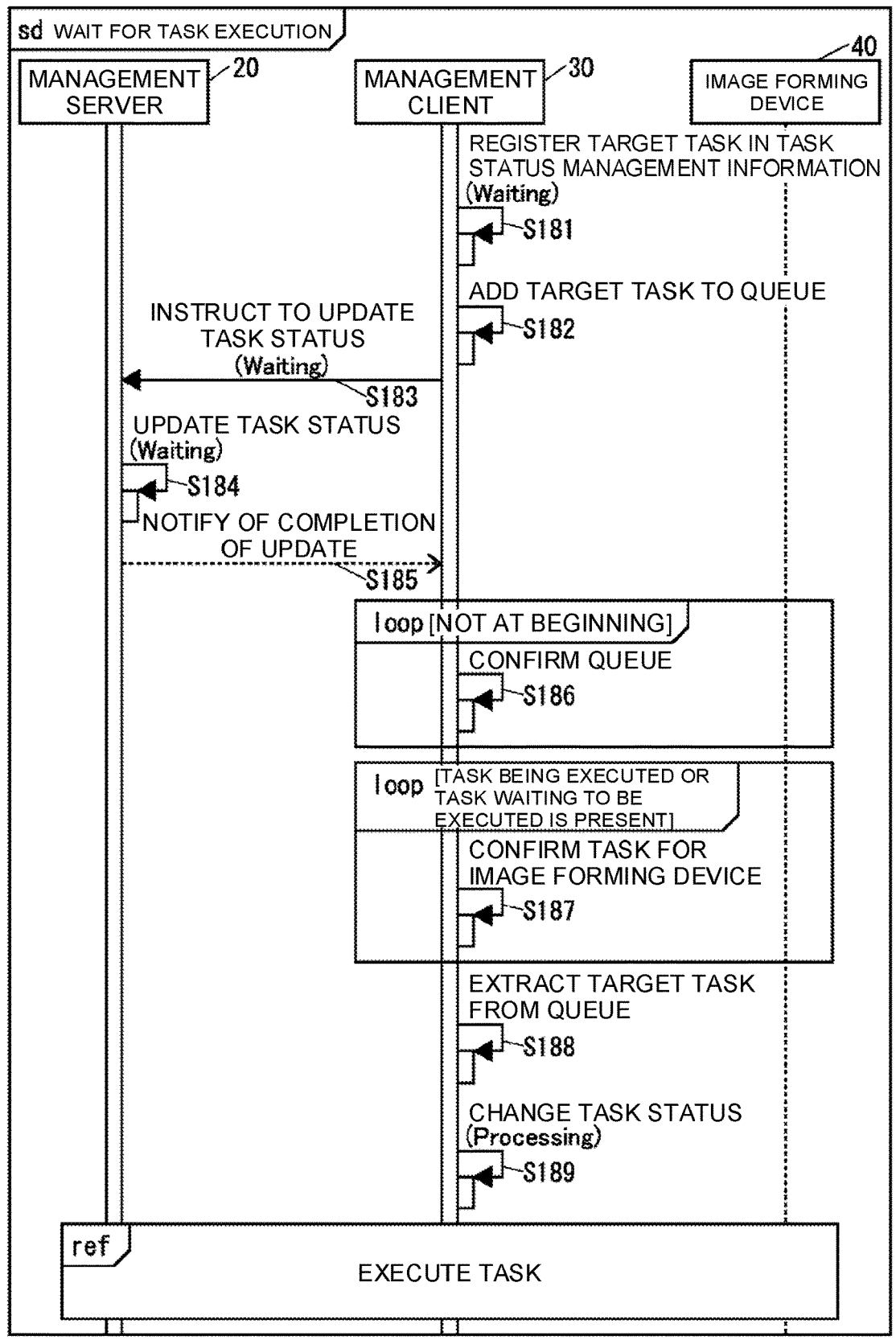
FIG. 14 is a sequence diagram of part of the sequence diagram illustrated in FIG. 12.

FIGS. 12 to 14 are sequence diagrams of operations of the system 10 when the current time and date is after the schedule time and date of the task registered in the scheduler of the management client 30.

In the following description of the operations illustrated in FIGS. 12 to 14, the task for which the current time and date is after the schedule time and date, i.e., the task that triggers the start of the operations illustrated in FIGS. 12 to 14, among the tasks registered in the scheduler of the management client 30 is referred to as the target task. The image forming device for which the target task is to be executed is the image forming device 40 for the sake of simple description.

As illustrated in FIGS. 12 to 14, the management client application 35a of the management client 30 deletes the target task from the scheduler (S141).

Subsequently, the management client application 35a requests the scheduled task stored in the management server 20 from the management server 20 (S142).

In response to the request at S142, the management server application 25a of the management server 20 generates the task information for each scheduled task indicated by the task management information 24c as is the case with the process at S122 (S143).

Then, the management server application 25a transmits the task information on all the scheduled tasks generated at S143 to the management client 30 as is the case with the process at S123 (S144).

In response to the received task information transmitted at S144, the management client application 35a of the management client 30 confirms whether the current time and date is after the designated start time and date of the target task based on the received task information (S145).

When it is determined at S145 that the current time and date is not after the designated start time and date of the target task, the management client application 35a terminates the operations illustrated in FIGS. 12 to 14 without executing the target task. The processes at S142 to S145 allow the management client application 35a to properly operate even when the designated start time and date of the target task in the management server 20 has been changed to be after the current time and date or when the target task has been deleted in the management server 20. The processes at S142 to S144 may be executed exclusively on the target task.

When it is determined at S145 that the current time and date is after the designated start time and date of the target task, the management client application 35a confirms based on the task status management information 34c whether at least one of the task being executed and the task waiting to be executed is present for the image forming device 40 (S146). Specifically, the management client application 35a determines that there is the task being executed when the device ID of the image forming device to be executed is the device ID of the image forming device 40 and the task with the task status "Processing" is present in the task status management information 34c. Furthermore, the management client application 35a determines that there is the task waiting to be executed when the device ID of the image forming device to be executed is the device ID of the image forming device 40 and the task with the task status "Waiting" is present in the task status management information 34c.

When it is confirmed at S146 that neither the task being executed nor the task waiting to be executed are present for the image forming device 40, the management client application 35a of the management client 30 determines that the task status of the target task is "Processing" and registers the target task in the task status management information 34c (S147).

Subsequently, the management client application 35a instructs the management server 20 to update the task status of the target task (S161). This instruction includes, as the task ID, the task ID of the target task and "Processing" as the task status.

In response to the received instruction at S161, the management server application 25a of the management server 20 updates the task status of the task with the task ID included in the instruction to "Processing" included in the instruction (S162).

The management server application 25a notifies the management client 30 of the completion of the update at S162 (S163).

In response to the received notification at S163, the management client application 35a of the management client 30 executes the target task on the image forming device 40 (S164).

The management client application 35a instructs the management server 20 to update the task status of the target task in a frequent timing, e.g., at an interval of one minute, while the target task is executed (S165). This instruction includes, as the task ID, the task ID of the target task and "Processing" as the task status.

In response to the received instruction at S165, the management server application 25a of the management server 20 updates the task status of the task with the task ID included in the instruction to "Processing" included in the instruction (S166).

The management server application 25a notifies the management client 30 of the completion of the update at S166 (S167).

When the target task is ended after the process at S164, the image forming device 40 notifies the management client 30 of the end of the target task (S168).

In response to the received notification at S168, the management client application 35a of the management client 30 changes the task status of the target task in the task status management information 34c to "Successful" (S169).

Subsequently, the management client application 35a instructs the management server 20 to update the task status of the target task (S170). This instruction includes, as the task ID, the task ID of the target task and "Successful" as the task status.

In response to the received instruction at S170, the management server application 25a of the management server 20 updates the task status of the task with the task ID included in the instruction to "Successful" (S171).

The management server application 25a notifies the management client 30 of the completion of the update at S171 (S172).

In response to the received notification at S172, the management client application 35a of the management client 30 deletes the target task from the task status management information 34c (S173).

When it is confirmed at S146 that at least one of the task being executed and the task waiting to be executed is present for the image forming device 40, the management client application 35a of the management client 30 determines that the task status of the target task is "Waiting" and registers the target task in the task status management information 34c (S181).

Subsequently, the management client application 35a adds the target task to the dedicated queue of the image forming device 40 (S182). The management client application 35a manages a queue for each image forming device.

After the process at S182, the management client application 35a instructs the management server 20 to update the task status of the target task (S183). This instruction includes, as the task ID, the task ID of the target task and "Waiting" as the task status.

In response to the received instruction at S183, the management server application 25a of the management server 20 updates the task status of the task with the task ID included in the instruction to "Waiting" included in the instruction (S184).

The management server application 25a notifies the management client 30 of the completion of the update at S184 (S185).

Subsequently, the management client application 35a of the management client 30 confirms whether the target task is at the beginning of the queue until it is confirmed that the target task is at the beginning of the queue (S186).

When it is confirmed at S186 that the target task is at the beginning of the queue, the management client application 35a confirms whether neither the task being executed nor the task waiting to be executed are present for the image forming device 40 based on the task status management information 34c until it is confirmed that neither the task being executed nor the task waiting to be executed are present for the image forming device 40 (S187).

When it is confirmed at S187 that neither the task being executed nor the task waiting to be executed are present for the image forming device 40, the management client application 35a extracts the target task from the queue (S188).

Subsequently, the management client application 35a changes the task status of the target task in the task status management information 34c to "Processing" (S189).

Then, the system 10 executes the processes at S161 to S172.

The above describes the case where the execution of the target task is successful. However, after the process at S163, the execution of the target task may fail due to various causes such as a problem due to a network connection.

Figure 15:
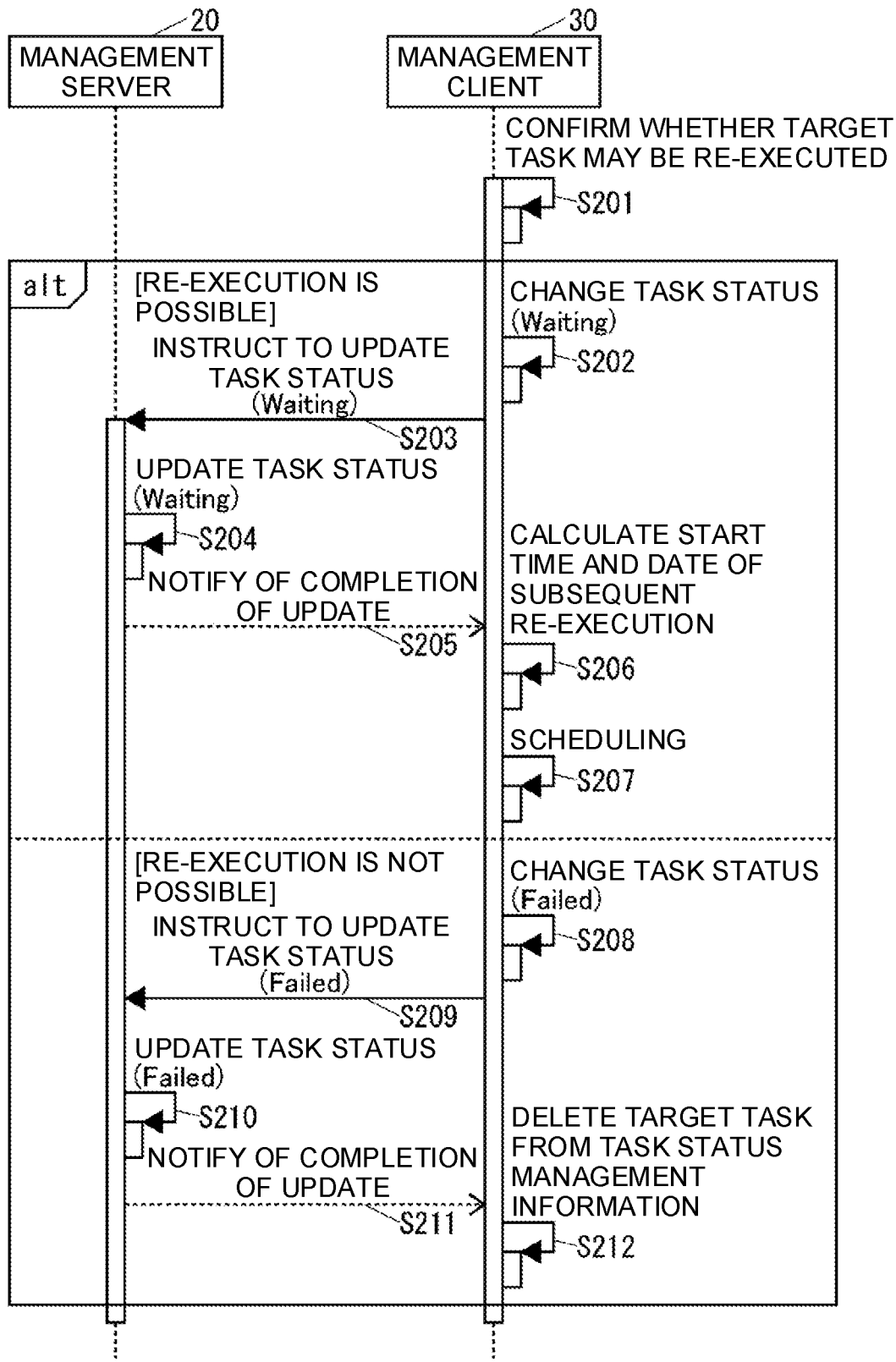
FIG. 15 is a sequence diagram of an operation of the system illustrated in FIG. 1 when the execution of the target task fails.

FIG. 15 is a sequence diagram of the operation of the system 10 when the execution of the target task fails.

As illustrated in FIG. 15, the management client application 35a of the management client 30 confirms whether the target task may be re-executed based on the retry count in the retry setting of the target task and the count of re-executions of the target task up to the present time (S201).

When it is confirmed at S201 that the target task may be re-executed, the management client application 35a changes the task status of the target task in the task status management information 34c to "Waiting" (S202).

Subsequently, the management client application 35a instructs the management server 20 to update the task status of the target task (S203). This instruction includes, as the task ID, the task ID of the target task and "Waiting" as the task status.

In response to the received instruction at S203, the management server application 25a of the management server 20 updates the task status of the task with the task ID included in the instruction to "Waiting" (S204).

The management server application 25a notifies the management client 30 of the completion of the update at S204 (S205).

In response to the received notification at S205, the management client application 35a of the management client 30 calculates the start time and date of the subsequent re-execution of the target task based on the designated start time and date of the target task, the retry interval in the retry setting of the target task, and the count of re-executions of the target task up to the present time (S206). For example, when the retry interval in the retry setting of the target task is 10 minutes, the count of re-executions of the target task up to the present time is three times, and therefore the subsequent re-execution is the fourth re-execution, the time and date obtained by adding 40 minutes (=10 minutes×4 times) to the designated start time and date of the target task is the start time and date of the subsequent re-execution of the target task.

After the process at S206, the management client application 35a schedules the target task in accordance with the start time and date calculated at S206 (S207). Specifically, the management client application 35a registers the target task in the scheduler so that the target task is executed at the start time and date calculated at S206.

Therefore, when the current time and date is after the schedule time and date for the target task registered in the scheduler of the management client 30, the operations illustrated in FIGS. 12 to 14 are executed. With regard to the re-executed target task, after the process at S141, the process at S146 is executed without executing the processes at S142 to S145.

When it is confirmed at S201 that the target task is not re-executable, the management client application 35a changes the task status of the target task to "Failed" in the task status management information 34c (S208).

Subsequently, the management client application 35a instructs the management server 20 to update the task status of the target task (S209). This instruction includes, as the task ID, the task ID of the target task and "Failed" as the task status.

In response to the received instruction at S209, the management server application 25a of the management server 20 updates the task status of the task with the task ID included in the instruction to "Failed" (S210).

The management server application 25a notifies the management client 30 of the completion of the update at S210 (S211).

In response to the received notification at S211, the management client application 35a of the management client 30 deletes the target task from the task status management information 34c (S212).

Next, an operation of the management server 20 when the task status in the task management information 24c is set is described.

Figure 16:
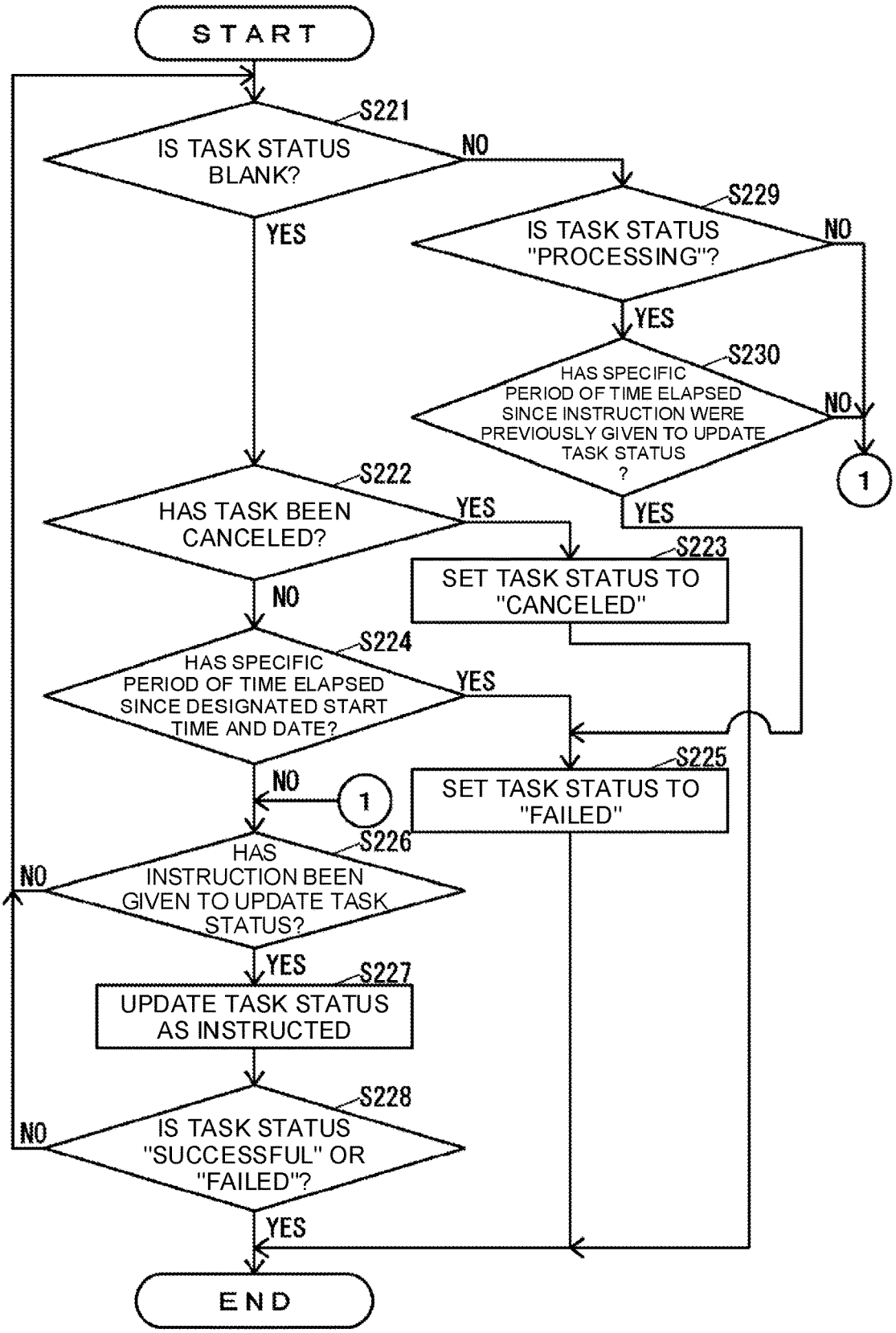
FIG. 16 is a flowchart of an operation of the management server illustrated in FIG. 2 when the task status in the task management information is set.

FIG. 16 is a flowchart of the operation of the management server 20 when the task status in the task management information 24c is set.

When a task is registered in the task management information 24c, the management server application 25a of the management server 20 executes the operation illustrated in FIG. 16 for each registered task.

In the description of the operation illustrated in FIG. 16 below, the task targeted for the operation illustrated in FIG. 16 is referred to as the target task.

As illustrated in FIG. 16, the management server application 25a determines whether the task status of the target task is blank in the task management information 24c (S221).

When it is determined at S221 that the task status of the target task is blank in the task management information 24c, the management server application 25a determines whether the target task has been canceled in the management server 20 (S222).

When it is determined at S222 that the target task has been canceled in the management server 20, the management server application 25a sets the task status to "Canceled" (S223) and terminates the operation illustrated in FIG. 16.

When it is determined at S222 that the target task has not been canceled in the management server 20, the management server application 25a determines whether a specific period of time has elapsed since the designated start time and date of the target task in the task management information 24c (S224).

When it is determined at S224 that a specific period of time has elapsed since the designated start time and date of the target task in the task management information 24c, the management server application 25a sets the task status to "Failed" (S225) and terminates the operation illustrated in FIG. 16.

When it is determined at S224 that a specific period of time has not elapsed since the designated start time and date of the target task in the task management information 24c, the management server application 25a determines whether the management client 30 has given an instruction to update the task status (S226).

When it is determined at S226 that the management client 30 has given an instruction to update the task status, the management server application 25a updates the task status as instructed (S227). The process at S227 corresponds to the processes at S162, S166, S171, S184, S204, and S210.

After the process at S227, the management server application 25a determines whether the task status is "Successful" or "Failed" (S228).

When it is determined at S228 that the task status is "Successful" or "Failed", the management server application 25a terminates the operation illustrated in FIG. 16.

When it is determined at S226 that the management client 30 has not given an instruction to update the task status or it is determined at S228 that the task status is neither "Successful" nor "Failed", the management server application 25a executes the process at S221.

When it is determined at S221 that the task status of the target task is not blank in the task management information 24c, the management server application 25a determines whether the task status is "Processing" (S229).

When it is determined at S229 that the task status is "Processing", the management server application 25a determines whether a specific period of time has elapsed since the management client 30 previously gave an instruction to update the task status (S230).

When it is determined at S229 that the task status is not "Processing" or it is determined at S230 that a specific period of time has not elapsed since the management client 30 previously gave an instruction to update the task status, the management server application 25a executes the process at S226.

When it is determined at S230 that a specific period of time has elapsed since the management client 30 previously gave an instruction to update the task status, the management server application 25a sets the task status to "Failed" (S225) and terminates the operation illustrated in FIG. 16.

When the management client 30 gives an instruction to update the task status (YES at S226), the task status is updated as instructed (S227); therefore, when the task status of the target task is blank in the task management information 24c (YES at S221), it means that the management client 30 has not given an instruction to update the task status. When the management client 30 has not instructed the management server application 25a to update the task status even though a specific period of time has elapsed since the designated start time and date (YES at S224), there is a possibility that, for example, the management client 30 is not functioning properly. Therefore, the management server application 25a sets the task status to "Failed" (S225) and completes the task.

When the task status is "Processing" (S162), the management client 30 is supposed to given an instruction to update the task status frequently (S166). When the task status is "Processing" (YES at S229) and when a specific period of time has elapsed since the management client 30 previously instructed the management server application 25a to update the task status (YES in S230), there is a possibility that, for example, the management client 30 is not functioning properly. Therefore, the management server application 25a sets the task status to "Failed" (S225) and completes the task.

The above describes the case where there is one image forming device for which one task is to be executed. However, there may be multiple image forming devices for which one task is to be executed. When there are multiple image forming devices for which one task is to be executed, the part handled in units of tasks in the above-described operation is handled in units of combinations of a task and an image forming device. With regard to the deletion of a task from the task status management information 34c, however, the deletion may be executed not in units of combinations of a task and an image forming device but in units of tasks.

The management server application 25a may cause the display unit 22 or a display unit of a computer (not illustrated) to display various types of information based on the device management information 24b and the task management information 24c. FIG. 17 is an example of the screen displaying multiple tasks, each of which has one image forming device as the execution target. FIG. 18 is an example of the screen displaying multiple tasks including a task having multiple image forming devices as the execution target. In FIGS. 17 and 18, "Operation type", "Task name", "Serial number", "Status", and "Created by" indicate the task type, the task name, the serial number, the task status, and the task creator, respectively.

In FIG. 18, the task with "Test upgrade" as "Task name" is the task having multiple image forming devices as the execution target. In FIG. 18, "2 devices" indicates that there are two image forming devices as the execution target for the task with "Test upgrade" as "Task name" The task with "Test upgrade" as "Task name" indicates not only the task status of each of the image forming devices but also the task status of the overall task. The task status of the overall task is set to "Processing" when any of the task statuses of the image forming devices is "Processing".

As described above, in the remote operation system 10a, the management client 30 schedules a task in accordance with the designated start time and date included in the task (S124), whereby the operation on the image forming device by the management client 30 may be executed in more appropriate timing than before.

In the remote operation system 10a, when another task is being executed or is waiting to be executed for the image forming device, waiting is set for execution of the task by the management client 30 for the image forming device (S181), whereby it is possible to reduce the possibility of failure of the task execution.

In the remote operation system 10a, the management client 30 instructs the management server 20 to update the task status when the task status is changed (S161, S165, S170, S183, S203, and S209), and the management server 20 updates the task status in the task management information 24c as instructed by the management client 30 (S162, S166, S171, S184, S204, S210, and S227). Thus, the remote operation system 10a allows the user of the management server 20 to know the task status.

In the remote operation system 10a, when the management client 30 has not given an instruction to update the task status (NO at S226) even though a specific period of time has elapsed since the designated start time and date (YES at S224), the management server 20 sets the task status in the task management information 24c to the failure status of execution of the task (S225). Therefore, the remote operation system 10a allows the user of the management server 20 to understand that execution of the task has failed when there is a certain failure, for example, the management client 30 is not properly functioning.

In the remote operation system 10a, the management client 30 regularly instructs the management server 20 to update the task status of the task while the task is executed (S166), and the management server 20 sets the task status in the task management information 24c to the failure status of execution of the task (S225) when the specific period of time has elapsed since the management client 30 previously gave an instruction to update the task status (YES at S230) while the task status in the task management information 24c is the status of the task being executed (YES at S229). Thus, the remote operation system 10a may reduce the possibility of making the user of the management server 20 to misunderstand that the task is in the status being executed when there is a certain failure, for example, the management client 30 is not properly functioning, and also may make the user of the management server 20 to understand that execution of the task has failed.

In the remote operation system 10a, when the task has multiple electronic devices as an execution target and the management client 30 gives an instruction to update the task status of the task for each of the image forming devices, and the task management information 24c includes the task status for each combination of a task and an image forming device, as illustrated in FIG. 4. Therefore, as illustrated in FIG. 18, the remote operation system 10a allows the user of the management server 20 to determine the task status for each combination of a task and an image forming device, whereby the convenience may be improved.

The management client 30 is a device different from the image forming device provided in the network 12 according to the present embodiment. However, any image forming device provided in the network 12 may function as a management client.

Although the electronic device according to the present disclosure is the image forming device in the present embodiment, the electronic device may be a device, such as a PC, other than an image forming device.

What is claimed is:

1. A remote operation system, comprising a management server having a first hardware processor executing computer instructions and a management client having a second hardware processor executing computer instructions, that manage an electronic device, wherein
   the management server manages a task that is an operation on the electronic device by the management client,
   the task includes a designated start time and date that is a time and date designated to start the task, the management server providing the designated start time and date as a time difference between the designated start time and date and the current time in a first time zone where the management server is provided,
   the management client regularly acquires the task from the management server and schedules the task in accordance with the designated start time and date included in the task, the management client generating the designated start time and date by applying the time difference to the current time in a second time zone where the management client is provided, and managing execution of the task in accordance with the designated start time and date generated, and
   the management client determines, when the execution of the task fails, a start time and date of re-execution of the task based on the designated start time and date of the task and a count of re-executions of the task up to the present time.

2. The remote operation system according to claim 1, wherein when a current time and date is after a time and date scheduled for the task and when there is a different task being executed or waiting to be executed for the electronic device, the management client waits for the scheduled task to be executed.

3. The remote operation system according to claim 1, wherein
   the management server stores task management information to manage the task,
   the task management information includes a task status that is a status of the task,
   the management client instructs the management server to update the task status when the task status is changed, and
   the management server updates the task status in the task management information as instructed by the management client.

4. The remote operation system according to claim 3, wherein, when the management client has not given an instruction to update the task status even when a specific period of time has elapsed since the designated start time and date, the management server sets the task status in the task management information to a failure status of execution of the task.

5. The remote operation system according to claim 3, wherein
   the management client regularly instructs the management server to update the task status of the task while the task is executed, and
   the management server sets the task status in the task management information to a failure status of execution of the task when a specific period of time has elapsed since previously instructed by the management client to update the task status while the task status in the task management information is a status of the task being executed.

6. The remote operation system according to claim 3, wherein the task has multiple electronic devices as an execution target and the management client gives, for each of the electronic devices, an instruction to update the task status of the task, and the task management information includes the task status for each combination of the task and the electronic devices.

7. A management client that manages an electronic device, wherein the management client has a hardware processor executing computer instructions to implement that from a management server that manages a task that is an operation on the electronic device by the management client, the management client regularly acquires the task, the task includes a designated start time and date that is a time and date designated to start the task, the designated start time and date being provided by management server as a time difference between the designated start time and date and the current time in a first time zone where the management server is provided, the management client schedules the task in accordance with the designated start time and date included in the task, the management client generating the designated start time and date by applying the time difference to the current time in a second time zone where the management client is provided, and managing execution of the task in accordance with the designated start time and date generated, and the management client determines, when the execution of the task fails, the start time and date of re-execution of the task based on the designated start time and date of the task and a count of re-executions of the task up to the present time.

8. A non-transitory computer-readable recording medium storing a management client program that causes a computer to function as a management client that manages an electronic device, wherein from a management server that manages a task that is an operation on the electronic device by the management client, the management client regularly acquires the task, the task includes a designated start time and date that is a time and date designated to start the task, the designated start time and date being provided by management server as a time difference between the designated start time and date and the current time in a first time zone where the management server is provided, the management client schedules the task in accordance with the designated start time and date included in the task, the management client generating the designated start time and date by applying the time difference to the current time in a second time zone where the management client is provided, and managing execution of the task in accordance with the designated start time and date generated, and the management client determines, when the execution of the task fails, the start time and date of re-execution of the task based on the designated start time and date of the task and a count of re-executions of the task up to the present time.

* * * * *